March 15, 1927.  1,621,239

H. A. DENMIRE

APPARATUS FOR COVERING TIRE BEADS

Filed Oct. 10, 1921   3 Sheets-Sheet 1

INVENTOR.
Harold A. Denmire
BY
ATTORNEY.

March 15, 1927.  1,621,239
H. A. DENMIRE
APPARATUS FOR COVERING TIRE BEADS
Filed Oct. 10, 1921  3 Sheets-Sheet 2
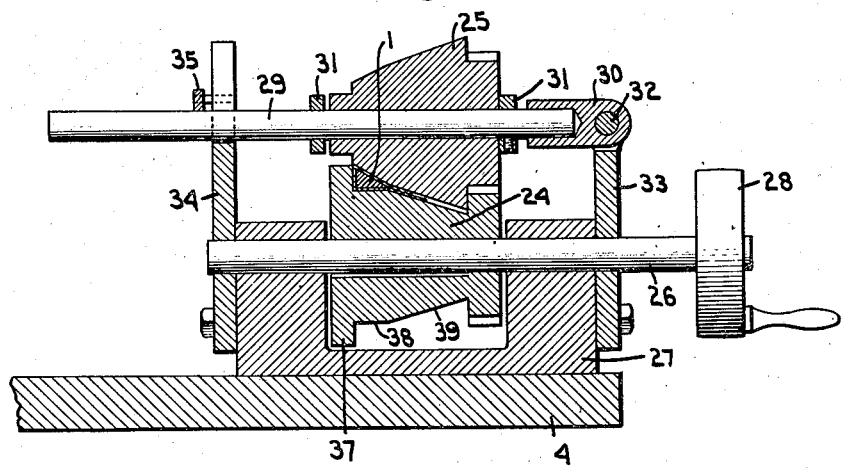
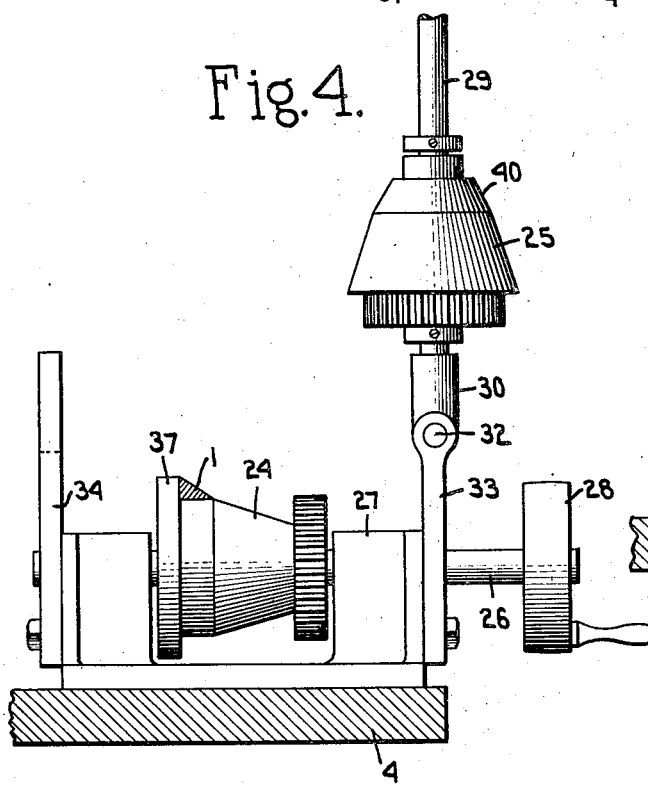
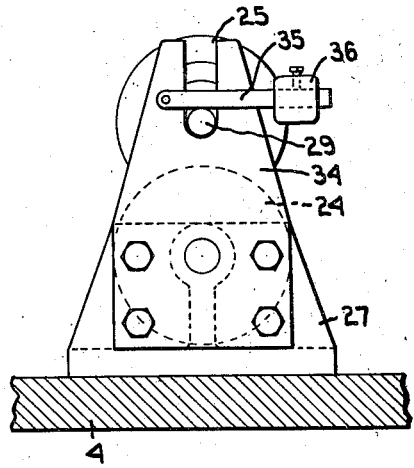
INVENTOR.
Harold A. Denmire
BY
ATTORNEY.

March 15, 1927.
H. A. DENMIRE
APPARATUS FOR COVERING TIRE BEADS
Filed Oct. 10, 1921   3 Sheets-Sheet 3
1,621,239
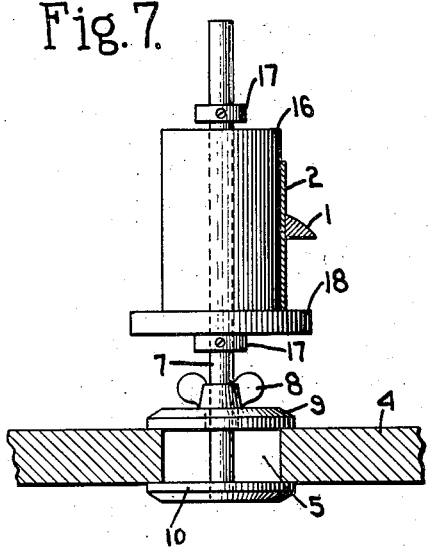
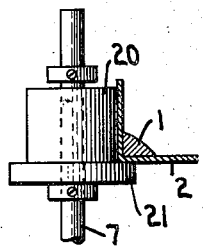
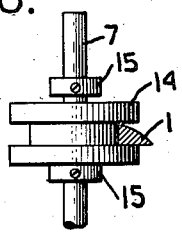
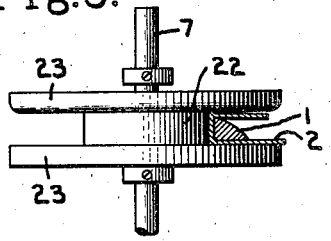
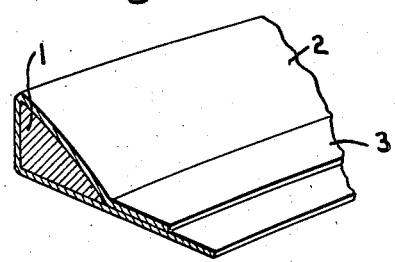
INVENTOR.
Harold A. Denmire
BY
ATTORNEY.

Patented Mar. 15, 1927.

1,621,239

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

APPARATUS FOR COVERING TIRE BEADS.

Application filed October 10, 1921. Serial No. 506,671.

This invention relates to an apparatus for use in covering circular objects with fabric, being especially designed and intended for covering tire beads although it is not necessarily limited to this purpose.

In the manufacture of pneumatic tires, particularly of the inextensible bead or straight side type, it is customary to cover the bead prior to its incorporation in the tire with a layer of fabric which surrounds the bead and is provided with an outwardly extending flap that is located between the plies in the side walls of the completed tire. This strip of covering fabric is known in the art as the "flipper strip". Previous to my invention the said strip has customarily been applied by hand and it is the purpose of the invention to design and construct a machine by which the strip can be applied more quickly and accurately than by the hand operation.

These and other objects will be apparent from the showing and description, which is such as to enable one skilled in the art to practise the invention, and it is to be understood that the invention is not necessarily limited to the form and arrangement of the parts of the machine herein disclosed as variations and modifications may be made within the scope of the invention.

In the drawings—

Fig. 3 is a cross section on the line 3—3 of Fig. 1, showing the covered head in position.

Fig. 4 is an elevation of the parts shown in Fig. 3, with an uncovered bead in place in the machine.

Fig. 5 is an end elevation of the parts shown in Fig. 3.

Figure 1:
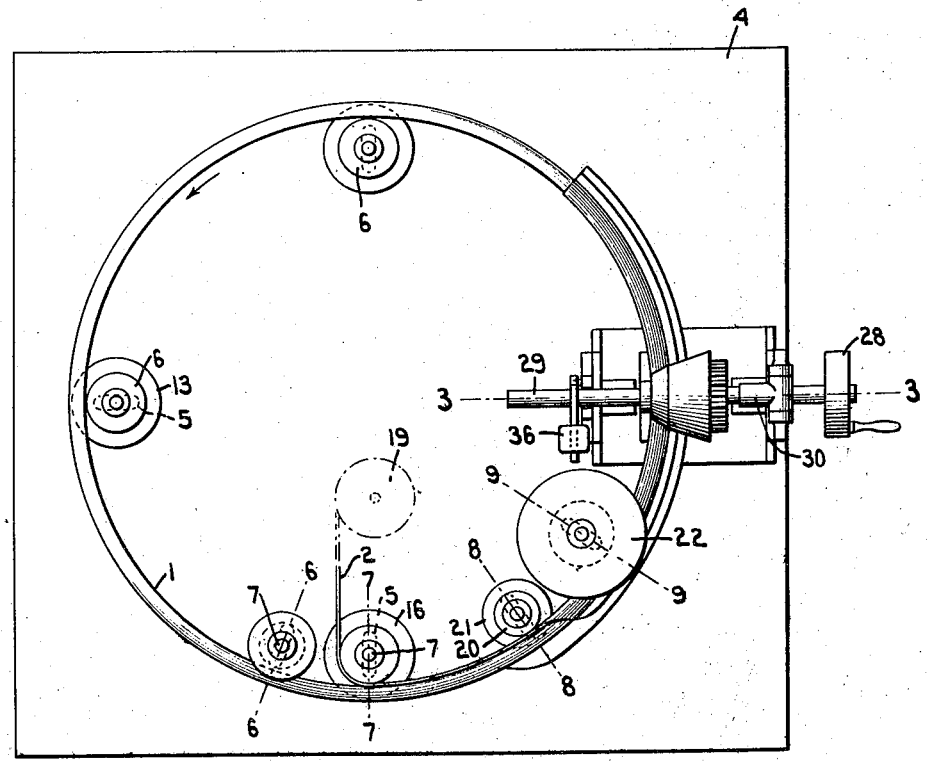
Fig. 1 is a plan view of the machine.
Figure 2:
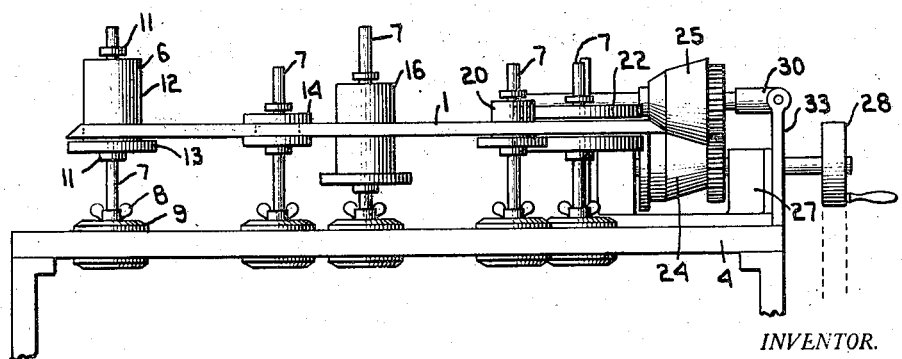
Fig. 2 is a side elevation.

Figs. 6, 7, 8 and 9 are sections on the lines 6—6; 7—7; 8—8 and 9—9 of Fig. 1, respectively, showing the several rollers which operate upon the bead in the order named.

Fig. 10 is a view showing the bead as covered by the machine.

The bead which the machine is designed to cover is shown at 1 and the fabric covering at 2, the latter surrounding the bead on all sides and being somewhat wider than the perimeter of the bead so as to extend outwardly from the point or outer edge of the bead to form a flap, which is comprised of the two edges of the fabric of unequal widths. This is known as the "flipper strip" and is designed to be smoothly and evenly positioned over the bead with the correct widths for each portion forming the flap or extension 3.

The machine comprises a platform or table 4 in which are located a plurality of radial slots 5 in which are mounted the supports for the various guide rollers, the slots being for the purpose of providing an adjustable mounting to accommodate different size beads.

At two points spaced approximately 90° apart are mounted two guiding and supporting rollers 6, the axes 7 of which extend within the slot 6 being held in adjusted position by wing nuts 8 bearing on plates 9, which rest on the top of the table, the lower end of the shaft 7 having a head or base 10 bearing against the under surface of the table. Each of the several guiding and supporting rollers are similarly mounted and no further description of this feature will be necessary.

The rollers 6 are mounted between two collars 11 on the shaft 7 and each is provided with a comparatively high barrel or drum 12 the lower end of which is formed with a flange 13. The rollers 6 are so located on the shafts that the flanges will support the bead at the proper elevation.

The bead is rotated in the direction of the arrow in Fig. 1 and the next roller it meets after leaving the second roller 6 is a narrow double flanged roller 14, supported on a shaft 7 between two adjustable collars 15. The collars 15 are adjusted so as to allow a slight vertical play of the roller and the flanges serve to guide the bead accurately with respect to the next roller which positions the bead with relation to the covering fabric.

The next roller is the one designated by the numeral 16 and is shown in Fig. 7. This roller is similar to the rollers 6, having a flange 18, except that it is located lower on its shaft 7 than the rollers 6, being confined by the adjustable collars 17. The fabric 2 is fed to the bead at this point from any suitable source, as for example, a roll or supply 19 and is positioned so that the bead 1 occupies a central location thereon, the amount of fabric on either side of the bead being determined at this point, and being adjusted by the vertical position of the roller 16 and the flange 18, with respect to the roller 14.

From the roller 16 the bead and the fabric pass to a roller 20 on a shaft 7, this roller being provided with a flange 21 which bends the lower side of the fabric up around one side of the bead as shown in Fig. 8.

The next roller in line of travel of the bead is the roller 22 shown in Fig. 9 which roller is provided with a groove of substantially the depth of the bead, formed by two deep flanges 23 which hold and bend the fabric in parallel relation on the sides of the bead. The upper flange 23 may be rounded slightly to assist in bending over the fabric.

The bead and fabric are now ready for the final shaping and covering operation, to perform which function it is passed between two horizontally arranged feeding and covering rollers 24 and 25 having inter-meshing gear teeth. The lower roller 24 is mounted on a shaft 26, in a bracket 27 secured to the top of the table 4, the shaft being provided with a pulley or crank 28 by which the two rollers may be rotated. The upper roller 25 is rotatably mounted between collars 31 on a shaft 29, secured at one end in a sleeve 30 which is pivotally mounted at 32 in the upper end of an arm 33 secured to the bracket 26. The roller 25 is arranged to be raised and lowered from the roller 24 to admit the bead by raising the shaft 29 as shown in Fig. 4. The outer end of the shaft 29 is received in a fork of a bracket 34 attached to the bracket 27. When the roller 25 is lowered it is yieldingly held in place by a pivoted lever 35 which rests on the end of the shaft 29 in lowered position, being held down by a weight 36 or other yielding means.

The roller 24 is formed with a flange 37 against which the inner surface of the bead is designed to bear and with a cylindrical portion 38 to hold the bead. Above the portion 38 the roller is formed as a truncated cone 39 which conforms to the flap of the bead cover. The roller 25 is formed in the shape of a truncated cone the sides of which are parallel to the surface 39 except for a slightly more tapered portion 40, which corresponds with the long side or hypothenuse of the bead.

The operation will be readily understood. The roller 25 is raised as shown in Fig. 4 and the uncovered bead placed in the angle of the roller 25 and in position on the several rollers 6, 14, 16, 20 and 22, and the roller 25 is lowered in position held by the weight 36. The end of the fabric is then passed between the bead and the roller 16, the frictioned fabric adhering to the sticky or tacky surface of the bead. The rollers 24 and 25 are then started in rotation and the bead is passed around in the apparatus, the rollers 20 and 22 serving to fold the fabric around the bead and the rollers 24 and 25 shaping it to the sides of the bead and pressing the tacky faces of the fabric together to form the flap. The rotation is continued until the leading end of the fabric reaches the roller 16, when the fabric is severed and the rotation is continued until the bead is completely covered. The weight 36 allows the roller 25 to give slightly to accommodate splices in the fabric or irregularities in the surface of the bead.

The apparatus is simple and effective and operates to cover the bead more rapidly and accurately than the hand operation. The height of the flap and the distribution of the fabric in the two loose edges is determined by the adjustment of the roller 16 to the plane of the bead as fixed by the other rollers. The machine may be set for different sized beads by adjustment of the several rollers in the slots 5.

Claims:

1. In an apparatus for covering circular tire beads, a table, a plurality of flanged rollers arranged about the bead and elevated above the table so as to support the bead in a horizontal plane spaced from the table, a fabric applying roller having means for positioning the fabric relative to the bead so that the bead will be located centrally of the fabric and feeding and applying rollers on the two sides of the bead to press the fabric to the bead and unite the two edges in a flap.

2. In a bead covering machine, means to guide a strip of covering fabric so that the central portion thereof will be attached to the inner surface of the bead, a roller having an angular seat in its surface to receive two sides of the bead, and a tapered surface to receive a flap of the fabric, and a second roller above the first named roller having a surface to correspond with the third side of the bead, and a tapered surface parallel with the tapered surface of the other roller and means to rotate the bead on its axis through said rollers.

3. Apparatus for applying fabric strips to bead core rings, comprising cooperating idle roller means for supporting and applying a fabric strip to the inner face of a ring and folding it radially thereabout, said roller means being arranged on the arc of a circle corresponding to the bead ring, and roller means for engaging the bead ring fabric and margins and simultaneously pressing said margins together and drawing the bead ring and strip through said idle roller means.

HAROLD A. DENMIRE.